(12) United States Patent
Shi

(10) Patent No.: US 8,456,824 B2
(45) Date of Patent: Jun. 4, 2013

(54) HOUSING AND PORTABLE ELECTRONIC DEVICE USING THE SAME

(75) Inventor: Fa-Guang Shi, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 61 days.

(21) Appl. No.: 13/185,665

(22) Filed: Jul. 19, 2011

(65) Prior Publication Data

US 2012/0154997 A1 Jun. 21, 2012

(30) Foreign Application Priority Data

Dec. 20, 2010 (CN) .......................... 2010 1 0596242

(51) Int. Cl.
*H05K 5/00* (2006.01)
*H05K 7/00* (2006.01)
*G09G 5/00* (2006.01)

(52) U.S. Cl.
USPC ............ 361/679.26; 361/679.27; 361/679.28; 361/679.29; 361/679.3; 361/679.55; 361/679.56; 361/679.57; 361/679.58; 345/156; 345/157; 345/168; 345/169

(58) Field of Classification Search
USPC ............ 361/679.01, 679.02, 679.08, 679.09, 361/679.3, 679.5, 679.51–679.59; 174/250–256
See application file for complete search history.

(56) References Cited

U.S. PATENT DOCUMENTS

2007/0293005 A1* 12/2007 Shigenobu et al. ........... 438/238

* cited by examiner

*Primary Examiner* — Zachary M Pape
*Assistant Examiner* — Jerry Wu
(74) *Attorney, Agent, or Firm* — Altis Law Group, Inc.

(57) ABSTRACT

A portable electronic device includes a housing and a display mounted onto the housing. The housing includes a bottom wall, a peripheral wall extending from the bottom wall, and a support wall extending from the peripheral wall, along a direction parallel to the bottom wall. The support wall has a top surface, and forms a receiving space together with the peripheral wall and the bottom wall cooperatively. The top surface of the support wall defines a receiving slot surrounding the receiving space. The display is mounted on the housing, and received within the receiving slot of the support wall, to align with the top surface of the support wall of the housing. The support wall further comprises a plurality of buffer slots defined in a bottom surface of the receiving slot and positioned at the corners of the housing.

13 Claims, 4 Drawing Sheets

HOUSING AND PORTABLE ELECTRONIC DEVICE USING THE SAME

BACKGROUND

1. Technical Field

This disclosure relates to housing structures, and particularly to a housing and portable electronic device using the same.

2. Description of Related Art

A commonly used portable electronic device generally includes a housing and a display mounted onto the housing for showing information. The housing often includes a back cover and a front cover. The front cover and the back cover are generally fixed together by welding technology, adhesives, or latched together by special mechanical latching structures.

However, the existing conventional housing has a poor structure, and a portable electronic device using such housing generally has a poor impact resistance or drop-resistance performance. The portable electronic device using such housing is easily broken after being dropped and hitting a hard surface, especially at the corners of the portable electronic device, thereby causing a great amount of external impact to the portable electronic device.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings like reference numerals designate corresponding parts throughout the several views. Wherever possible, the same reference numerals are used throughout the drawings to refer to the same or like elements of an embodiment.

DETAILED DESCRIPTION

Figure 1:
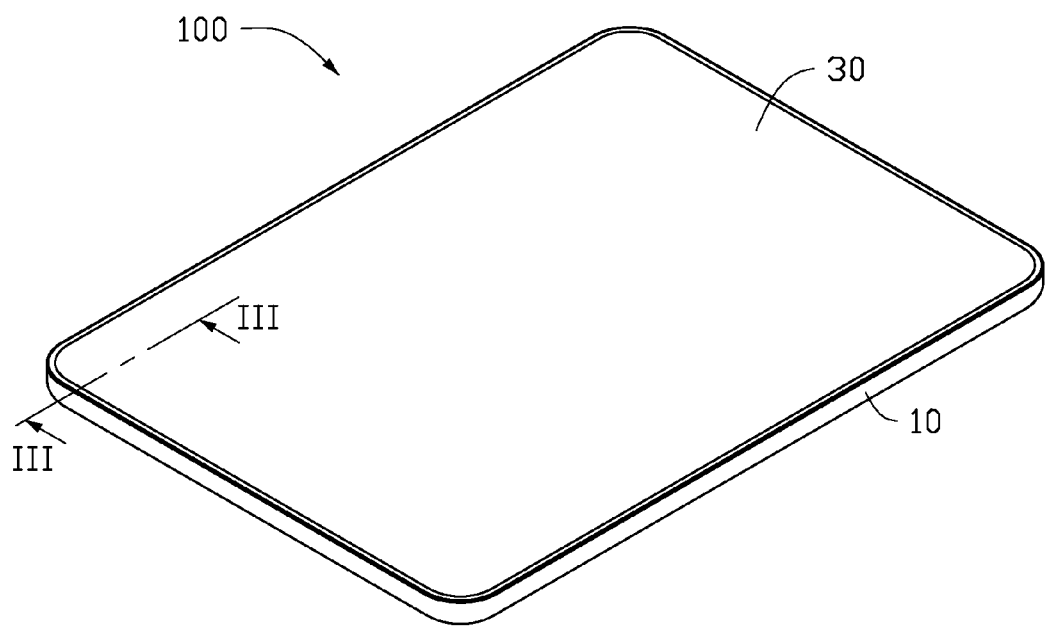
FIG. 1 is an assembled, isometric view of an embodiment of a portable electronic device.
Figure 2:
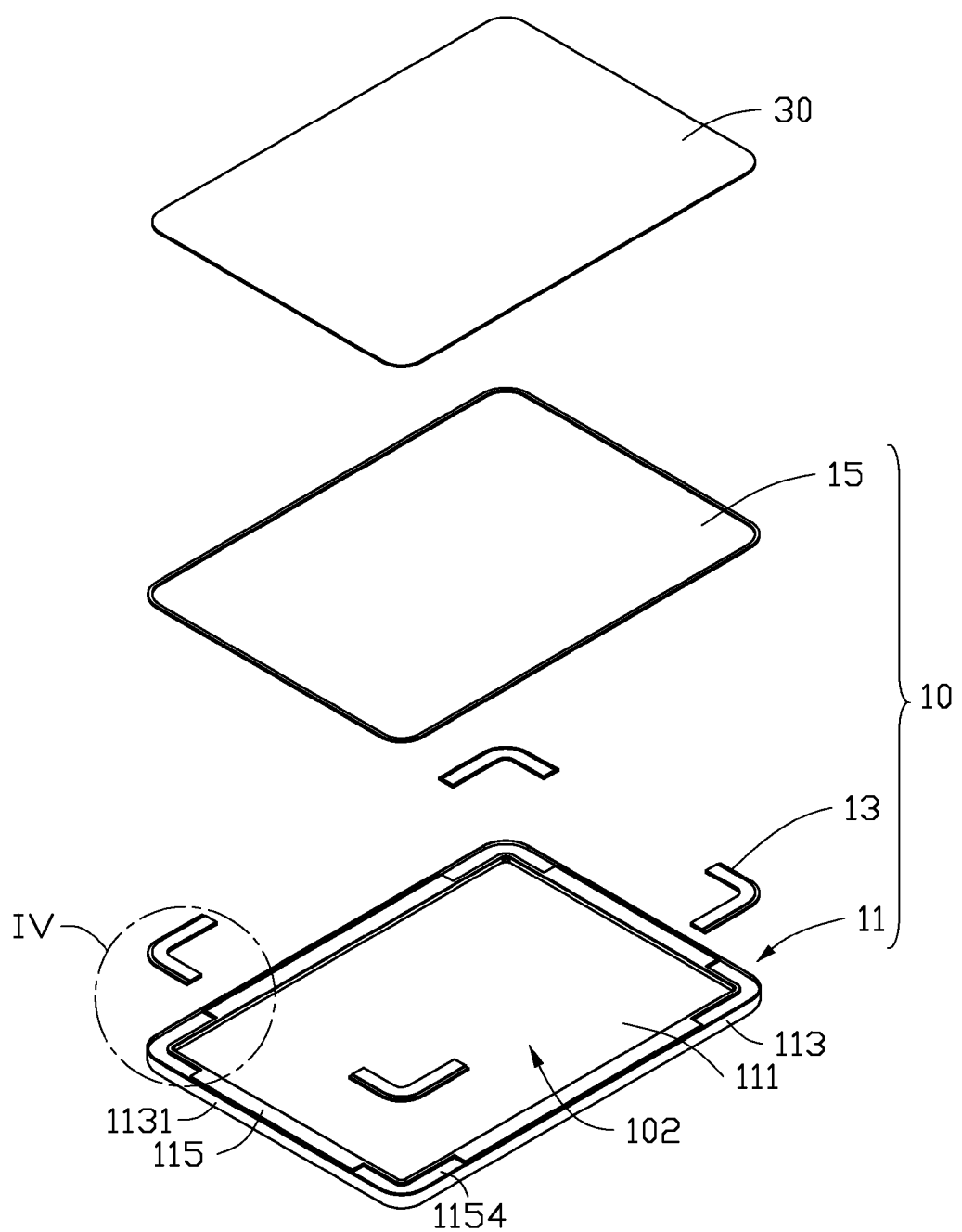
FIG. 2 is an exploded, isometric view of the portable electronic device of FIG. 1.

Referring to FIGS. 1 and 2, an embodiment of a portable electronic device 100 is shown. The portable electronic device 100 may be a touch panel computer, a mobile phone, a digital album, or a personal digital assistant (PDA), etc. In the illustrated embodiment, the portable electronic device 100 is a touch panel computer, and includes a housing 10 and a display 30 mounted onto the housing 10. It is to be understood that, the portable electronic device 100 also includes other components, such as a circuit board, a plurality of electronic components, etc., that are not described in the embodiments.

Figure 3:
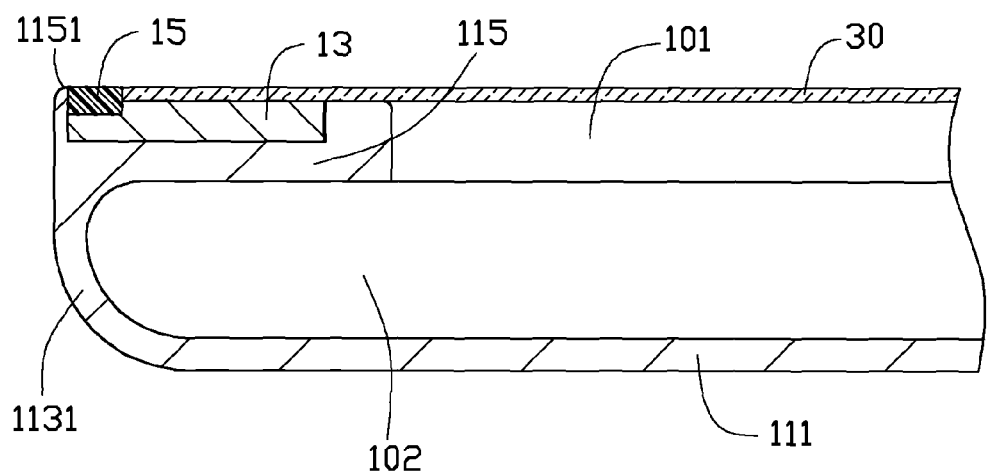
FIG. 3 is a partial cross-section of the portable electronic device of FIG. 1, taken along line III-III.
Figure 4:
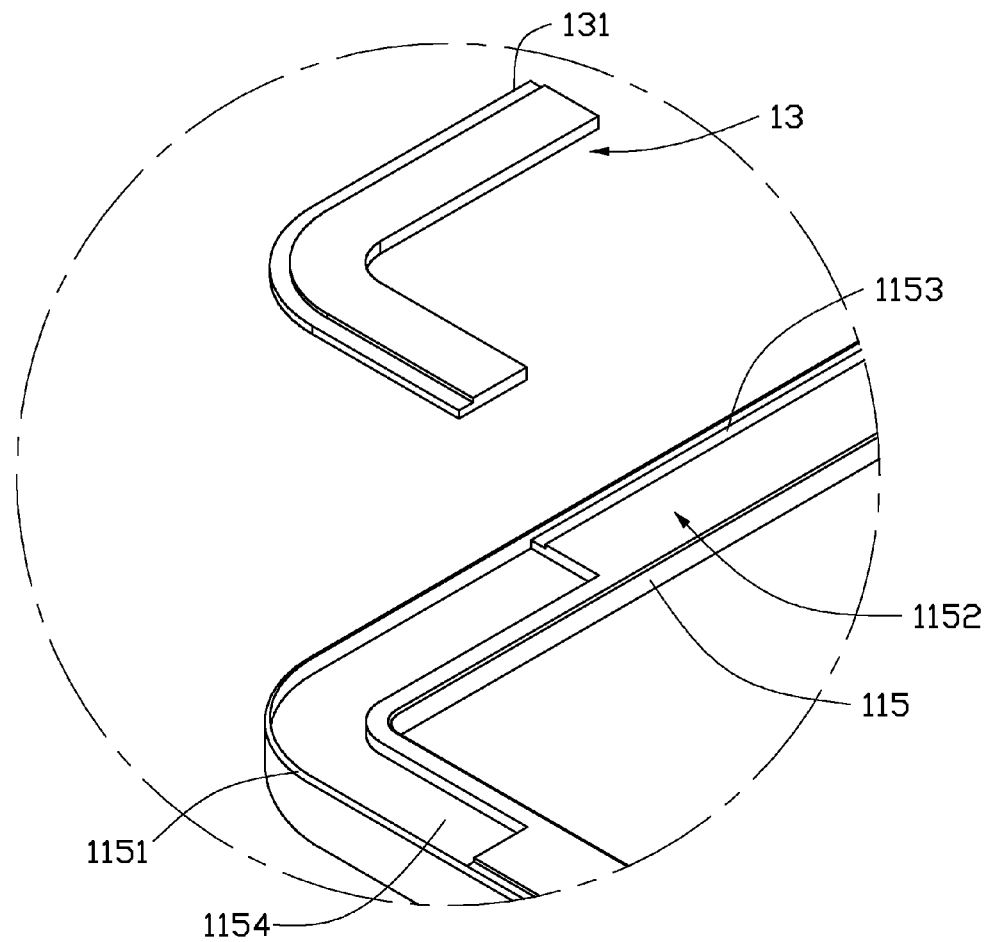
FIG. 4 is an enlarged partial isometric view of the encircled section IV of FIG. 2.

Also referring to FIGS. 3 and 4, the housing 10 includes a bottom shell 11, a plurality of protection blocks 13, and a frame 15. The bottom shell 11 is substantially rectangular and integrally formed in the illustrated embodiment. The bottom shell 11 includes a bottom wall 111, a peripheral wall 113 extending from a periphery of the bottom wall 111, and a support wall 115 extending from a distal end of the peripheral wall 113, along a direction facing toward a central portion of the bottom wall 111 and parallel to the bottom wall 111. The bottom wall 111, the peripheral wall 113 and the support wall 115 cooperatively define a substantially rectangular receiving space 102 having an opening 101. The peripheral wall 113 is substantially rectangular frame shaped and includes four side walls 1131 perpendicularly extending from four side edges of the bottom wall 111, respectively, and the side walls 1131 are connecting to each other. The support wall 115 includes a top surface 1151 positioned away from the bottom wall 111. A receiving slot 1152 is recessed from the top surface 1151 of the support wall 115 to surround the receiving space 102, and is configured for receiving the display 30 therein. A substantially rectangular ring-shaped mounting slot 1153 is defined in a bottom surface (not labeled) of the receiving slot 1152 corresponding to the frame 15. The mounting slot 1153 is positioned adjacent to an outer peripheral edge of the peripheral wall 113, and surrounds the opening 101 of the housing 10. Four substantially L-shaped buffer slots 1154 are defined in the bottom surface of the receiving slot 1152 and positioned at four corners of the receiving slot 1152.

There are four protection blocks 13 in the illustrated embodiment, and are assembled within the four buffer slots 1154 of the housing 10, respectively. Each protection block 13 is substantially L-shaped, and defines a matching slot 131 adjacent to an edge thereof, corresponding to the mounting slot 1153 of the housing 10. The protection block 13 can be made of stainless steel, tungsten steel, or other suitable materials.

The frame 15 is a hollow rectangular frame, and is made of plastic, in the illustrated embodiment. The frame 15 is assembled within the mounting slot 1153 of the housing 10, and aligned with the top surface 1151 of the support wall 115.

The display 30 is mounted on the housing 10, and received within the receiving slot 1152 of the support wall 115, to align with a top surface (not labeled) of the frame 15 and the top surface 1151 of the support wall 115.

A method for making the bottom shell 11 of FIG. 2 includes the following steps: a mold and a metal billet are provided; a pre-formed body is formed by die casting or forging method, wherein, the pre-formed body includes a bottom wall 111 and a peripheral wall 113 extending from a periphery of the bottom wall 111; the inner side surface of the peripheral wall 113 is milled to form a support wall 115 parallel to the bottom wall 111; the support wall 115 is milled to form a receiving slot 1152, and then the bottom surface of the receiving slot 1152 is milled to form the mounting slot 1153 and the four buffer slots 1154 to finally obtain the bottom shell 11.

When assembling the portable electronic device 100, the protection blocks 13 are first assembled within the buffer slots 1154 of the housing 10, respectively. The frame 15 is then assembled within the mounting slot 1153 of the housing 10, and aligned with the top surface 1151 of the support wall 115. Finally, the display 30 is mounted on the housing 10, and received within the receiving slot 1152 of the support wall 115, to align with the frame 15 and the top surface 1151 of the support wall 115, to finish the assembly of the portable electronic device 100.

The portable electronic device 100 has a simple structure, and is more durable with a much improved drop-resistance or impact-resistance performance, by means of having the protection blocks 13 assembled to the corners of the housing 10. The bottom shell 11 is integrally formed, such that, a drop-resistance or impact-resistance performance of the whole housing 10 is efficiently improved.

It is to be understood, however, that even through numerous characteristics and advantages of the disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A housing, comprising:
    a bottom wall;
    a peripheral wall extending from a periphery of the bottom wall;
    a support wall extending from a distal end of the peripheral wall, along a direction facing toward a central portion of the bottom wall and parallel to the bottom wall; the support wall having a top surface positioned away from the bottom wall, and the support wall, the peripheral wall and the bottom wall cooperatively defining a receiving space having an opening and a plurality of corners; and
    a plurality of protection blocks,
    wherein, the support wall comprises a receiving slot recessed from the top surface to surround the receiving space, and a plurality of buffer slots defined in a bottom surface of the receiving slot of the support wall and positioned at the plurality of corners, the plurality of protection blocks are assembled within the plurality of buffer slots of the support wall, a top surface of each protection block is coplanar with the bottom surface of the receiving slot.

2. The housing as claimed in claim 1, wherein the support wall further comprises a mounting slot defined in the bottom surface of the receiving slot and positioned adjacent to an outer peripheral edge of the peripheral wall to surround the opening of the housing; the housing further comprises a frame assembled within the mounting slot, and aligning with the top surface of the support wall.

3. The housing as claimed in claim 1, wherein the bottom wall, the peripheral wall and the support wall are integrally formed to be substantially rectangular, the bottom wall, the peripheral wall and the support wall cooperatively define a substantially rectangular receiving space; the peripheral wall is substantially rectangular frame shaped and includes four side walls perpendicularly extending from four side edges of the bottom wall, respectively, and connecting to each other in order.

4. The housing as claimed in claim 3, wherein the receiving slot is substantially rectangular ring-shaped, having four corners, four substantially L-shaped buffer slots are defined in the bottom surface of the receiving slot and positioned at the four corners of the receiving slot.

5. The housing as claimed in claim 4, wherein the protection block is made of stainless steel, or tungsten steel.

6. The housing as claimed in claim 2, wherein each protection block is substantially L-shaped, and defines a matching slot adjacent to an edge thereof, corresponding to the mounting slot of the housing.

7. A portable electronic device, comprising:
    a housing, comprising:
    a bottom wall;
    a peripheral wall extending from a periphery of the bottom wall; and
    a support wall extending from a distal end of the peripheral wall, along a direction facing toward a central portion of the bottom wall and parallel to the bottom wall; the support wall having a top surface positioned away from the bottom wall, and forming a receiving space together with the peripheral wall and the bottom wall cooperatively; the top surface of the support wall defining a receiving slot surrounding the receiving space;
    a plurality of protection blocks; and
    a display mounted on the housing, and received within the receiving slot of the support wall, to align with the top surface of the support wall of the housing;
    wherein the receiving space has an opening and a plurality of corners; the support wall further comprises a plurality of buffer slots defined in a bottom surface of the receiving slot and positioned at the plurality of corners, the plurality of protection blocks are assembled within the plurality of buffer slots of the support wall, a top surface of each protection block is coplanar with the bottom surface of the receiving slot.

8. The portable electronic device as claimed in claim 7, wherein the support wall further comprises a mounting slot defined in the bottom surface of the receiving slot and positioned adjacent to an outer peripheral edge of the peripheral wall to surround the opening of the housing; the housing further comprises a frame assembled within the mounting slot, and aligning with the top surface of the support wall.

9. The portable electronic device as claimed in claim 7, wherein the bottom wall, the peripheral wall and the support wall are integrally formed to be substantially rectangular, the bottom wall, the peripheral wall and the support wall together form a substantially rectangular receiving space; the peripheral wall is substantially rectangular frame shaped and includes four side walls perpendicularly extending from four side edges of the bottom wall, respectively, and connecting to each other in order.

10. The portable electronic device as claimed in claim 9, wherein the receiving slot is substantially rectangular ring-shaped, having four corners, and four buffer slots are defined in the bottom surface of the receiving slot and positioned at the four corners of the receiving slot.

11. The portable electronic device as claimed in claim 10, wherein the protection block is made of stainless steel, or tungsten steel.

12. The portable electronic device as claimed in claim 10, wherein the four buffer slots are substantially L-shaped, four substantially L-shaped protection blocks are respectively received within the four buffer slots, and each protection blocks defines a matching slot adjacent to an edge thereof, corresponding to the mounting slot of the housing and for engaging with the frame.

13. The portable electronic device as claimed in claim 8, wherein the frame is a hollow rectangular frame assembled within the mounting slot to align with the display.

* * * * *